United States Patent

Davis

[15] 3,662,143
[45] May 9, 1972

[54] METHOD AND APPARATUS FOR DETECTING AND CONTROLLING BY RELATIVE MOVEMENT BETWEEN THE TOOL AND WORKPIECE ARCING CONDITIONS IN AN EDM PROCESS

[72] Inventor: Malcolm F. Davis, Cincinnati, Ohio
[73] Assignee: Cincinnati Milacron Inc., Cincinnati, Ohio
[22] Filed: Dec. 21, 1970
[21] Appl. No.: 99,751

[52] U.S. Cl. .........................................219/69 G, 219/69 S
[51] Int. Cl. .....................................B23p 1/08, B23p 1/14
[58] Field of Search.....................219/69 C, 69 R, 69 G, 69 P, 219/69 S

[56] References Cited

UNITED STATES PATENTS 3,087,044 4/1963 Inoue....................................219/69 P
2,841,686 7/1958 Williams..............................219/69 G

FOREIGN PATENTS OR APPLICATIONS 759,190 10/1956 Great Britain.......................219/69 G Primary Examiner—R. F. Staubly
Attorney—Howard T. Keiser and Alfred J. Mangels

[57] ABSTRACT

In an EDM process, a method and apparatus for controlling arcing conditions in a machining gap. An apparatus is provided for detecting the presence of a noise signal contained in a discharge. The absence of this noise signal is indicative of an arcing condition which may be detected during a single or a predetermined number of discharges. Upon detection of the absence of said noise signal, corrective action is taken by moving the tool relative to the workpiece in a manner effective to alleviate said arcing condition.

9 Claims, 8 Drawing Figures

INVENTOR.
MALCOLM F. DAVIS

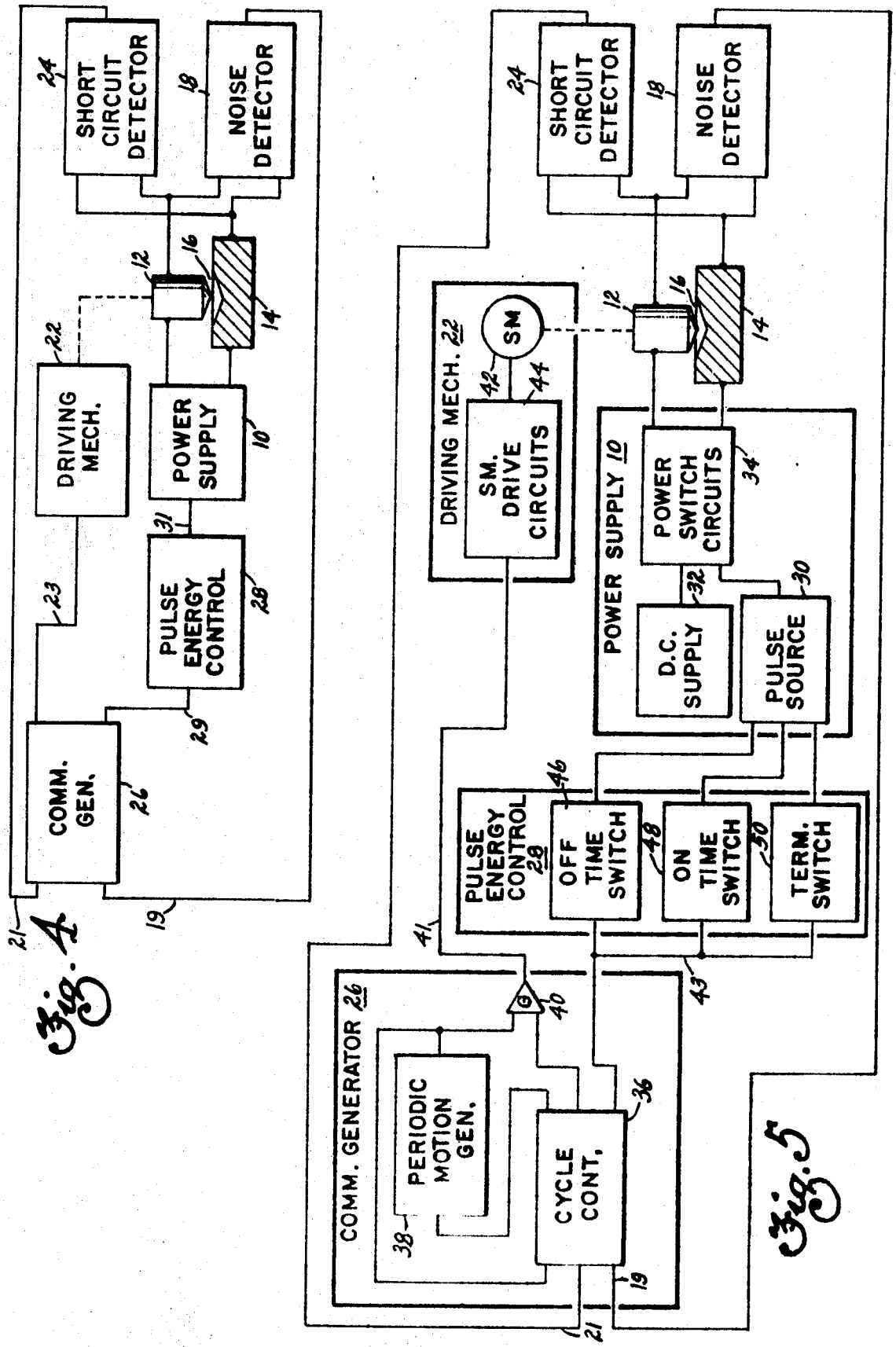

METHOD AND APPARATUS FOR DETECTING AND CONTROLLING BY RELATIVE MOVEMENT BETWEEN THE TOOL AND WORKPIECE ARCING CONDITIONS IN AN EDM PROCESS

BACKGROUND OF THE INVENTION

The invention relates generally to a method and apparatus for improving the automatic control of an electro-discharge machining (EDM) process. Specifically, the invention discloses a method and apparatus for controlling arcing conditions in the machining gap by disrupting the surfaces of the tool and workpiece defining the machining gap. Said disruption is controlled by appropriate enerization of the driving mechanism between the tool and workpiece. In the EDM process, a power supply provides machining pulses for generating electrical discharges across a machining gap formed in a dielectric medium between an electrically conductive tool and an electrically conductive workpiece. The relative position between said tool and workpiece being controlled by a servomechanism.

One condition causing considerable problem in the EDM process is that of arcing. Although arcing conditions are more prevalent when machining with dielectrics having a hydro-carbon content, arcing may occur and cause problems at any time. Even though the harmful effects of a sustained arcing condition can be readily detected and observed, there has been no exact determination of all the causes of arcing nor has there been sufficient apparatus developed that is able to detect the development of an arcing condition in its initial stages.

To better understand the arcing process, a review of an ideal EDM process is in order. In the ideal process, the dielectric strength will be assumed constant and uniform across the area of the gap. Under these conditions, the electric field will concentrate at a point where the distance between tool and workpiece is electrically shortest; and hence, the discharge will occur at that point. Metal is removed from the tool and workpiece with severe explosive action, and the next discharge will occur at some other point between the tool and workpiece where the electrical distance is minimal. Therefore, the discharges continuously move across the gap removing the highest existing points on the area of the workpiece and eroding it away to form the desired cut defined by the tool configuration. During the course of the discharge, the tool and workpiece surfaces in the vicinity of the discharge are subject to extremely high pressures and temperatures. The rapid changes in pressure and temperature following termination of the discharge are believed to be responsible in part for the explosive nature in which the melted metal is removed. If for some reason the necessary pressures and temperatures are not developed, metal on the tool and workpiece surfaces is melted but not removed. In this case, severe damage occurs to the tool and workpiece, and the machining process must be terminated.

This condition is defined as an arc and may readily occur with dielectrics having a high hydro-carbon content. During a particular discharge, dielectric breakdown forms amorphic carbon particles. If these particles are deposited on the tool and workpiece at the point of the discharge, the probability of occurrence of the next discharge at this point is enhanced, and therefore an arcing condition is created. This same condition can occur when a piece of graphite is dislodged from the tool and settles in the gap. As the discharges continue at the same point, the deposits continue to build; and the machining process is completely destroyed. In order to correct the situation, the power supply must be turned off, the tool removed from the workpiece and the deposits removed therefrom. Finally, since an arc is not a short circuit but is only a discharge which does not remove any metal, the short circuit detection circuits are ineffective in controlling arcing conditions.

There have been various attempts at detecting arcing conditions. One of these is to measure the electrical parameters in the gap between the discharges and obtain a signal representing gap impedance. However, such detection circuits must be very sensitive to small changes in these parameters and must have very fast response times because detection must be performed in the relatively short interval between discharges. Another system of arcing detection consists of counting the number of discharges in a predetermined period of time and comparing the discharges detected with the number of machine pulses transmitted to the gap during the same time. Finally, the design in some earlier power supplies permitted an arcing condition to degenerate into a continuous direct current flow. This current flow would not permit the detection of discharges, and hence the circuit signaled that corrective action was necessary. With a true pulse type power supply, such a detection scheme is inapplicable.

In order to overcome the inconsistencies and disadvantages of the above systems, applicant proposes to make use of a phenomenom ocurring during the discharge to provide an accurate and positive system for detecting and correcting arcing conditions. The basic mechanics of the development of the discharge are well known to those who are skilled in the art. Briefly, an initial voltage is applied to the gap, which ionizes or breaks the gap down. Then the voltage drops to a machining level for the duration of the discharge. Applicant has observed a characteristic of the process which occurs during a discharge across the gap and useful in detecting arcing conditions. This characteristic is the presence of a noise signal on the voltage signal during a discharge. This noise signal appears as an underdamped oscillation during a normal discharge. However, during an arcing condition, the noise signal or oscillation is absent from the voltage signal. Since it is not necessary for purposes of this application, applicant will not make an attempt to rationalize this phenomenom. Suffice to say, the phenomenom exists and applicant will use it to provide a substantially improved machining process. The detection of the presence and absence of the oscillation or noise signal provides an accurate and immediate indication of an arcing condition. This detection does not require the level of discrimination necessary for detecting particular levels of current, voltage or impedance. Further, this detection is not dependent on the condition causing the arcing condition. Further, applicant proposes an automatic system for correcting the arcing condition by moving the tool in close proximity to the workpiece thus dislodging or removing any impurities that may have been deposited on the tool and workpiece surfaces.

SUMMARY OF THE INVENTION

The invention disclosed provides a method and apparatus for automatically detecting and correcting arcing conditions during an EDM process. The machining process often results in an undesirable concentration of impurities in the machining gap. The depositing of these impurities on the tool and workpiece may operate to upset the inherent natural mechanics of the EDM process. Consequently, a noise signal that occurs during a normal discharge is severely attenuated or completely inhibited. By detecting the absence of this noise signal during a discharge, an immediate and accurate determination of an arcing condition is available. Therefore, in an EDM apparatus comprised in part of a driving mechanism coupled between an electrically conductive tool and an electrically conductive workpiece for establishing and maintaining a machining gap of a predetermined magnitude, the invention comprises a detection circuit for detecting the absence of a noise signal during a discharge which indicates the presence of an arcing condition, and an arcing correction control responsive to the detection circuit and connected to the driving mechanism for alternately decreasing and increasing the gap magnitude thus dislodging the impurities deposited on the tool and workpiece.

BRIEF DESCRIPTION OF THE DRAWINGS

FIG. 4 is a detailed block diagram illustrating a more advanced embodiment of the invention.

FIG. 5 is a detailed schematic block diagram illustrating the preferred embodiment of the invention.

DESCRIPTION OF THE PREFERRED EMBODIMENT

Figure 1:
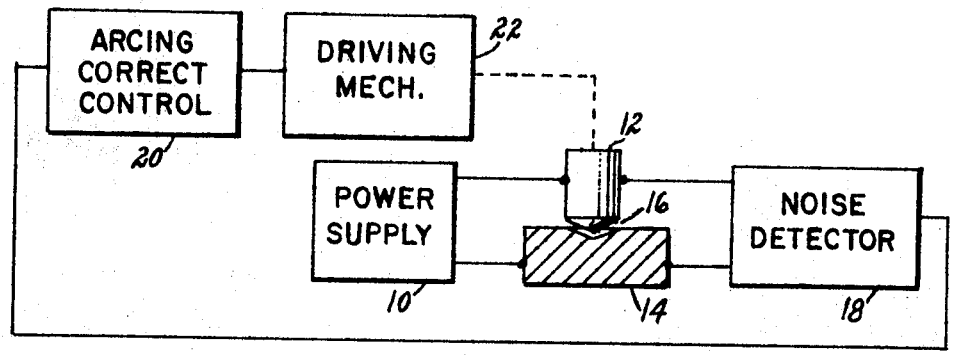
FIG. 1 is a general block diagram illustrating the invention.
Figures 2A, 2B:
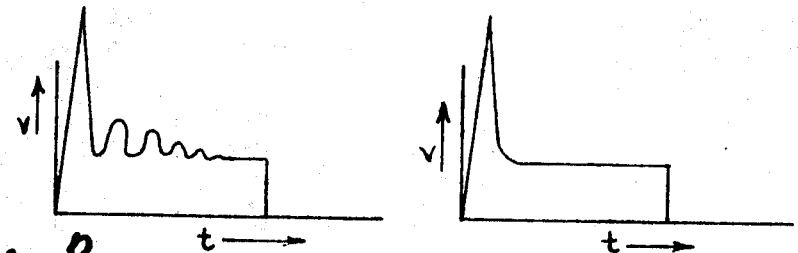
FIGS. 2a and 2b illustrate the presence and absence respectively, of the noise signal as it appears on the voltage signal during a discharge.

FIG. 1 is a general block diagram illustrating the invention. A power supply 10 is connected to an electrically conductive tool 12 and an electrically conductive workpiece 14 to form a machining gap 16 therebetween. The power supply produces machining pulses to the gap 16 which generate electrical discharges thereacross. The power supply 10 provides a voltage signal to the gap 16 causing it to break down or ionize, after which the voltage drops to a lower machining level for the duration of the discharge. FIG. 2a illustrates the voltage signal under ideal conditions. Modulated to the signal is a high frequency modulation or noise signal. This signal is present during normal machining conditions; however, during the presence of an arcing condition, the noise signal is dampened out and for all practical purposes disappears. Once the correlation between the noise signal and the presence of an arcing condition is discovered, the problem becomes one of detecting the absence of said noise signal. This may be done in several ways. A noise detector 18 is connected across the gap 16 and generates an output when the noise signal disappears or is absent from the voltage pulse during a good discharge. The noise detector output is connected to the arcing correction control 20. The arcing correction control produces a plurality of signals defining a cycle of events, the execution of which will terminate the arcing condition. The signals are supplied to a driving mechanism 22 which is operable to provide relative motion between the tool 12 and the workpiece 14 thus providing an unlimited number of gap magnitudes.

It should be noted that this disclosure only discusses those parts of a standard EDM apparatus which are germane to the present invention. As will be appreciated by those who are skilled in the art, the driving mechanism 22, tool 12, workpiece 14 and gap 16 are all part of a servomechanism control which controls the magnitude of the gap under normal machining conditions. Since an arcing condition is not a normal circumstance, the control of the tool 12 is of slightly different nature. Further, the interface and use of the arcing control with the standard servomechanism is a matter of simple gating and deemed obvious to those who are skilled in the art; and therefore, it is not shown. In addition, the dielectric medium and flow rate generation is well known to those skilled in the art and also is not shown.

In operation, upon receiving a signal from the noise detector 18, the correction control 20 produces a plurality of signals to generate a cycle of operation which is effective to alleviate the arcing condition. In its simpliest form, the correction comprises a cycle for alternately decreasing and increasing the gap magnitude. In other words, alternately moving the tool in close proximity with the workpiece and then removing it. This operation provides a scrubbing force on the surfaces of the tool and workpiece which bound the gap and operates to dislodge any impurities which have been deposited thereon. The presence of these deposits is the cause of the arcing condition; hence, their removal will terminate this condition.

Figure 3:
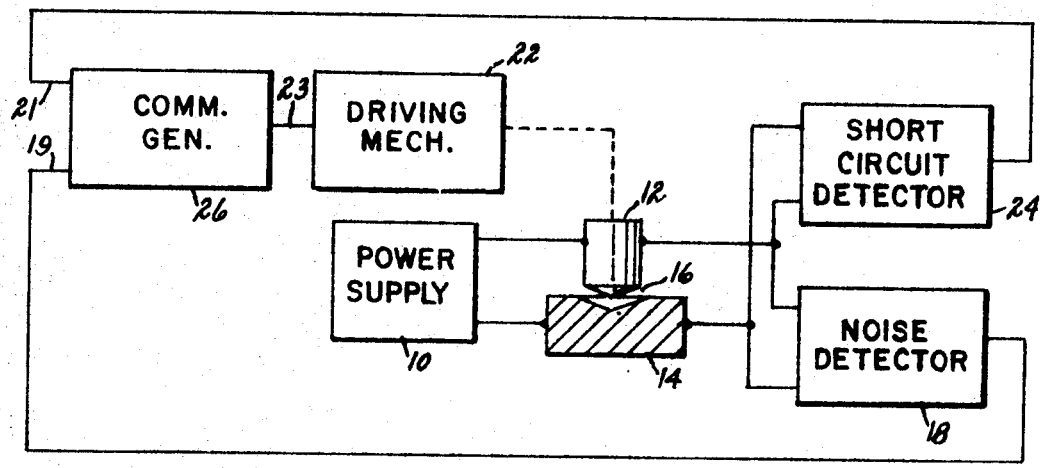
FIG. 3 is a detailed, block diagram illustrating one embodiment of the invention.

FIG. 3 is a block diagram that shows a more detailed embodiment. In this case, the arcing correction control is comprised of a short circuit detector 24 and a command generator 26. When the noise detector 18 produces an output signal to input 19 of the generator 26 indicating an absence of the noise signal and the presence of an arcing condition, the command generator 26 immediately produces on an output 23 a first output signal to the driving mechanism 22 commanding it to decrease the gap magnitude or drive the tool toward the workpiece. When the tool is in very close proximity to the workpiece or in some cases in contact therewith, the short circuit detector 24 produces a signal to the input 21 of the generator 26 which is effective to terminate the first signal and initiate a second output signal. This signal is effective to alternately decrease and increase the magnitude of the machining gap. This is accomplished by the driving mechanism 22 moving the tool toward and away from the workpiece in equal increments, a predetermined number of times. This bouncing action is effective to dislodge any impurities that may be causing the arcing condition. When this action is completed, the generator 26 produces a third output signal which commands the driving mechanism to increase the gap magnitude or move the tool away from the workpiece until the original gap magnitude is reestablished.

FIG. 4 is similar to FIG. 3 with the exception that a pulse energy control 28 is included. The control 28 has an input 29 responsive to the command generator 26 and an output 31 connected to the power supply 10. There are several ways in which pulse energy may be used to enhance the arcing correction. Most simply, after the first output signal commands the gap to decrease to the point of a short circuit, it may be desirable to drive the pulse energy to zero thus terminating the power supply output for the duration of the second and third output signals. The energy would then be restored to its predetermined value at the end of the third output signal from the command generator. A second method of using pulse energy control is to reduce the pulse energy to a predetermined minimal value upon detection of an arcing condition. This would still allow the detection of a short circuit as well as minimize the possibility of damage upon the arcing condition continuing. It would further be possible to combine both the functions described above thus providing the optimum power supply control during an arcing condition.

FIG. 5 is a detailed block diagram of the preferred embodiment of the system. The overall operation is similar to the systems earlier described. The power supply 10 is comprised of a pulse source 30, a direct current supply 32 and power switching circuits 34. The pulse source 30 is operative to produce a plurality of low power pulses. The time duration of these pulses is defined as the ON time; and the time duration between these pulses is defined as the OFF time. The ON time and OFF time of the low power pulses is identical to that of the machining pulses on the output of the power supply 10. The low power pulses control the switching action of the power switching circuits 34. The power switching circuits 34 generate the machining pulses by switching the output of the direct current supply in a time domain defined by the low power pulses. The machining pulses are applied to the gap 16 to generate discharges thereacross. When the noise detector 18 detects the absence of noise, it provides a signal to the input 19 of the command generator 26 comprised of cycle control 36 and a periodic motion generator 38. These elements generate the necessary signals for commanding the driving mechanism 22 in such a manner as to correct the arcing condition. When an arc is detected, first command signal is produced and causes two events. First, a signal is produced through the gate 40 on an output 41 to the driving mechanism 22. Although many types of mechanisms are well known to those who are skilled in the art, a stepping motor drive is illustrated in this embodiment. A stepping motor 42 is mechanically connected to the tool 12 thus providing relative motion between the tool 12 and workpiece 14 thereby changing the magnitude of the gap 16. Stepping motor 42 is controlled by stepping motor drive circuits 44. Typically, stepping motor drive circuits 44 require a signal defining the direction of motion and a plurality of pulses. Each pulse represents a minimum increment of tool motion while the frequency of the plurality of pulses defines the velocity of the tool. Hence, the first command signal produces signals from the gate 40 defining the direction and velocity of tool motion.

Simultaneously, the first command signal produces a signal on an output 43 to the pulse energy control 28 which is operative to adjust to the energy and frequency of machining pulses applied to the gap 16. The energy contained in a machining pulse is a function of the product of the ON time and the amplitude of the pulse. Hence, either parameter may be adjusted to control the energy. The pulse amplitude may be controlled by modifying the operation of the direct current supply 32 or power switching circuits 34. The ON time may be controlled by modifying the operation of the pulse source 30. Typically, the pulse source 30 is comprised of an astable multivibrator. A multivibrator is a two-stage oscillator wherein one stage conducts while the other is cutoff until a point is reached where the one stage becomes non-conductive and the other stage conducts. The time duration of conduction of the one stage may be defined as the OFF time. Typically, the conduction times are variable by means of a potentiometer in the circuit. Further, the output can be terminated by locking the stage defining the OFF time into conduction. Both of these techniques are well known to those who are skilled in the art. Therefore, when the arc is detected, the first command signal produced by the cycle control 36 is operative to energize the ON time switch 46 and the OFF time switch 48. These switches are operative to switch predetermined impedance values into the multivibrator stages to produce predetermined ON and OFF times. The ON time is reduced to a predetermined value consistent with the desired reduced pulse energy. The OFF time is switched to a predetermined value which is consistent with the frequency of the pulses supplied to the stepping motor 42 and hence the motion of the tool 12. Because of the nature of an arcing condition, it is essential that the discharges be kept to a minimum. Therefore, the energy is reduced; further the OFF time is adjusted so that only one pulse is applied for each increment of motion of the tool 12.

To summarize, upon detection of an arc, the tool is incrementally moved toward the workpiece decreasing the magnitude of the machining gap. Simultaneously, the energy of the machining pulses is reduced to a minimum level, and approximately one pulse per increment of tool motion is applied to the gap. When the tool is in close proximity to the gap, a short circuit will occur and be detected by the short circuit detector 24. The detector 24 produces a short circuit signal which is received by the arcing cycle control 36 thus immediately terminating the first command signal and initiating a second command signal. Further, at this time the cycle control 36 is operative to store the distance moved from the time the arc was detected until the time the short circuit was detected. Termination of the first command signal terminates tool motion and returns the ON time and OFF time switches to their original condition.

The second command signal is operative to energize the periodic motion generator 38 and the pulse termination switch 50. Therefore, the OFF time stage of the multivibrator is locked into conduction, and the production of machining pulses is terminated from the power supply 10. The motion generator 38 is operative to supply pulse and direction signals to the drive circuits 44 which are operative to cause the stepping motor 42 to alternately move the tool 12 toward and away from the workpiece 14 in equal increments a predetermined number of times. This action of successively decreasing and increasing the gap magnitude is effective to disturb or dislodge deposits from the surfaces of the tool and workpiece. As described earlier, it is these deposits which facilitate the occurrence of an arcing condition. If they are sufficiently disturbed or removed by this action, the arcing condition will be destroyed. When the motion generator has executed its cycle the predetermined number of times, it sends a signal to the cycle control 36 which is operative to terminate the second command signal and initiate a third command signal.

The third command signal is operative to hold the pulse termination switch in the same condition and to provide signals to be drive circuits 44 for moving the tool away from the workpiece thus increasing the gap magnitude an amount equal to the distance stored at the termination of the first command signal. In other words, the tool is moved back to its original position at the time the arc was first detected. When this is done the cycle control 38 terminates the third command signal which returns the pulse termination switch to its original condition, thus restoring the application of machining pulses to the machining gap at their original energy level.

Figure 6A:
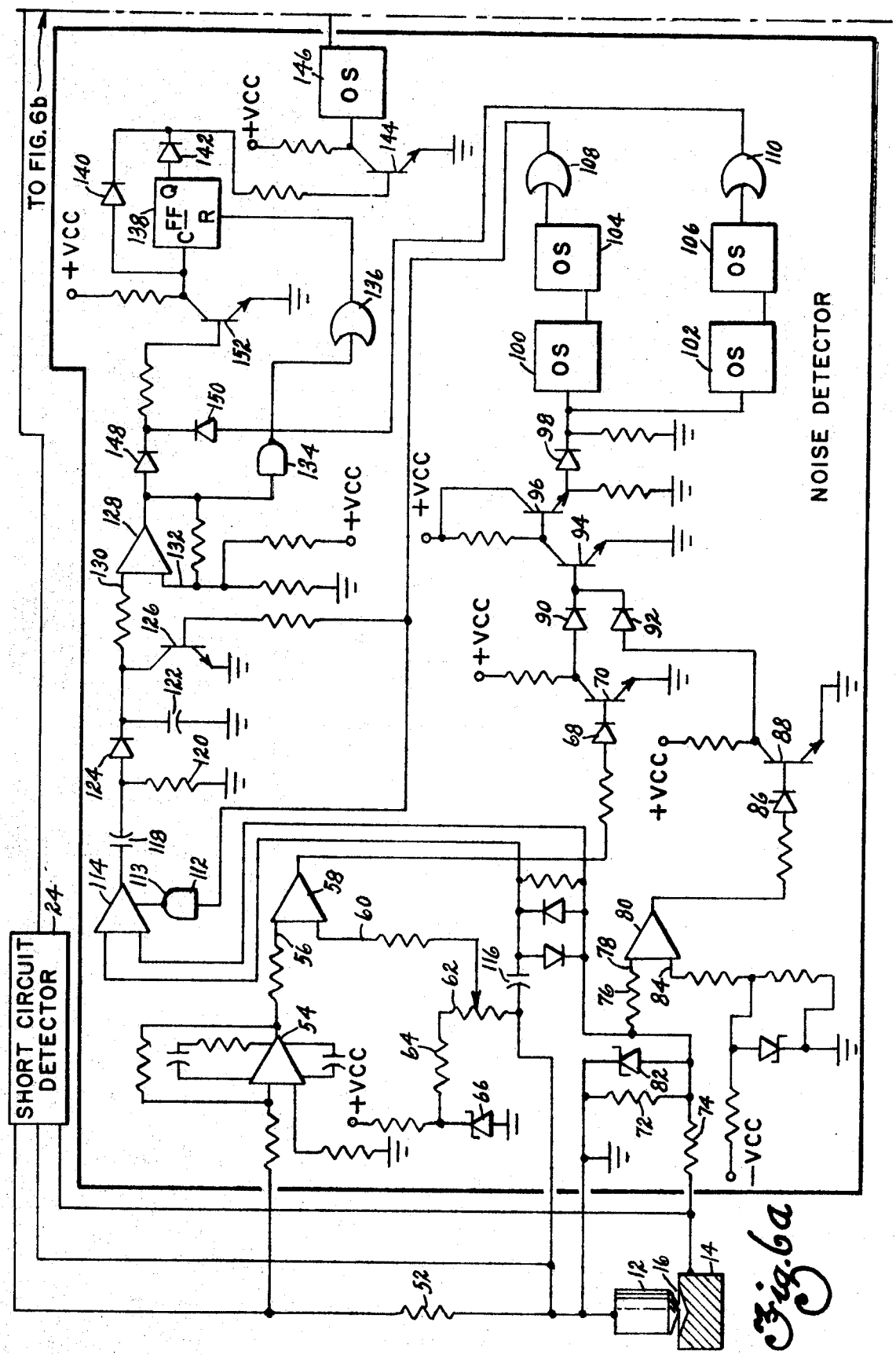
FIGS. 6a and 6b when joined along the indicated junction lines comprise a detailed schematic diagram of the noise detector, the cycle control and the periodic motion generator which comprise the more important elements of applicant's invention.
Figure 6B:
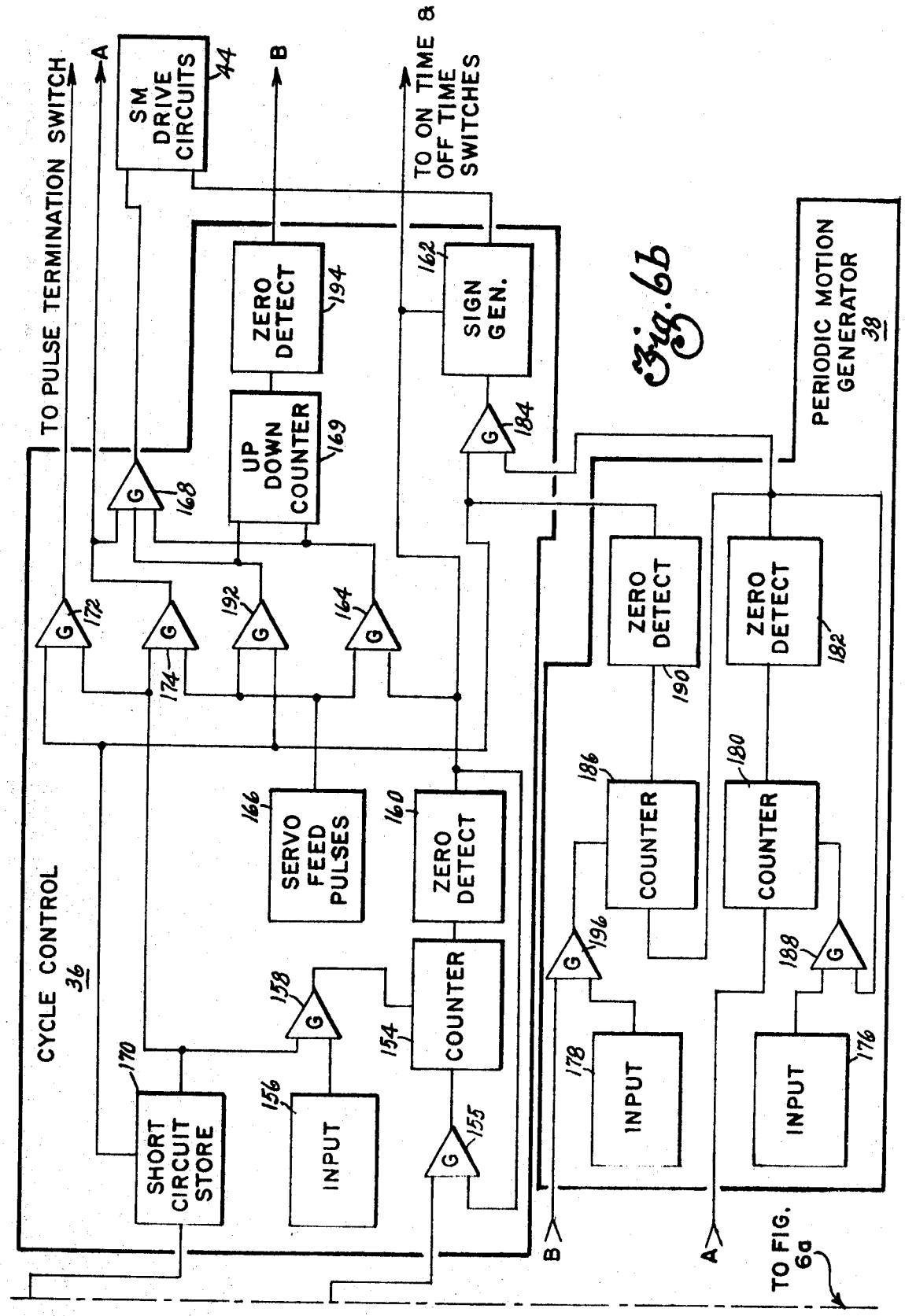

FIGS. 6a and 6b when joined along the indicated junction lines comprise a detailed schematic diagram of the noise detector 18, the cycle control 36 and the periodic motion generator 38. These elements are the heart of applicant's invention. Since the other elements can be found in the prior art, they are deemed to be with the knowledge of those who are skilled in the art; and therefore are not shown in detail. In FIG. 6a, a resistor 52 is in a series circuit with the tool 12, the gap 16, and the workpiece 14 all of which are across the output of the power supply (not shown). During a discharge, the current flow through the series circuit will produce a voltage drop across resistor 52. This potential is connected to the input of an operational amplifier 54 which amplifies and filters the input to produce a voltage pulse on its output having a magnitude proportional to the current pulse magnitude during the discharge. This output is connected to an input 56 of operational amplifer 58 which operates as a high speed comparator. The other input 60 to amplifer 58 contains a constant voltage magnitude that is produced from the potentiometer 62, which with resistor 64 constitutes a voltage divider circuit around the zener diode 66. The zener diode 66 is held in its breakdown condition thereby providing a constant source for the divider resistors 62 and 64. Therefore, whenever the voltage pulse from amplifier 54 has a magnitude in excess of the reference voltage on input 60, the amplifier 58 produces an output. This output passes through diode 68 to the base of transistor 70 driving it into conduction.

When a machining pulse is supplied by the power supply 10 such that a potential drop exists between the tool 12 and workpiece 14, the potential drop will cause a current flow through resistors 72 and 74 shunting the gap 16. The potential drop across resistor 72 is applied through resistor 76 on the input 78 of the operational amplifier 80. The zener diode 82 across the resistor 72 is merely to protect the amplifier 80 from excessive voltages on its input 78. Whenever a voltage magnitude on input 78 exceeds the reference voltage on input 84, the amplifer 80 produces an output which passes through diode 86 to the base of transistor 88 driving it into conduction.

The diodes 90 and 92 and transistors 94 and 96 comprise an AND gate. In other words, if either transistor 70 or 88 remains in its non-conductive state during the discharge, the transistor 94 remains in its conductive state. This indicates that there is a bad discharge because either the current or voltage across the gap has not exceeded some predetermined minimum value. If both a current and a voltage pulse do exist, both transistors 70 and 88 are driven into conduction and a potential occurs at the base of transistor 94 which is operative to drive it into its non-conductive state. This produces a more positive potential on the base of transistor 96 thus driving it into conduction. During a good discharge, a positive output exists on the emitter output of transistor 96 for the length of time that the current and voltage pulses co-exist across the machining gap. When the emitter of transistor 96 produces an output signal, it passes through diode 98 and triggers the monostable multivibrators 100 and 102.

These devices produce an output pulse which can be varied by changing the values of external elements connected thereto. The purpose of multivibrators 100, 102, 104 and 106 is to create a window or time frame during a good discharge for sampling the discharge and detecting the presence or absence of the noise signal. Referring back to FIGS. 2a and 2b, one can readily appreciate the fact that the voltage and current pulses are most irregular and unstable before and during the time of the gap breakdown or ionization. Therefore, it would be unwise to sample the gap during that time to detect the occurrence of a particular noise signal. Hence, the purpose of the multivibrators 100 and 102 is to provide a time delay before the time frame or sample time takes place. This permits the voltage and current pulse to settle out to their stable values for the remainder of the discharge. Therefore, by the time the multivibrators 100 and 102 have timed out, the electrical parameters in the gap have settled down to their discharge values; and the trailing edge of the multivibrator outputs are operative to trigger the monostable multivibrators 104 and 106. Each of these multivibrators produces an output which represent a sampling time during which the noise signal is detected. Typically, the window or time frame created by multivibrator 106 is approximately one-half the time and equally spaced within the window or time frame produced by multivibrator 104. Each of the outputs from the multivibrators 104 and 106 passes through a logic level interface 108 and 110 respectively. The only purpose of these devices is to interface between logic devices having different voltage levels. However, they also provide a signal inversion. The output of interface 108 passes through the inverter 112 and into the gate input 113 of a gated amplifier 114.

The inputs of the gated amplifier 114 are connected across the gap through the capacitor 116. During the sample time defined by the sample signal on the gate input 113, the amplifier 114 looks at the AC signals in the gap 16. The output of amplifier 114 is filtered by the capacitor 118 and resistor 120. The values of these components are chosen to pass a signal in the low megacycle region. The output of the filter passes through diode 124 which operates as a half wave rectifier and then builds up a charge on capacitor 122. During the sample times, the transistor 126 is held non-conductive. However, between sample times the transistor 126 conducts thus providing a discharge path for the capacitor 122. As the noise signal is detected for several cycles during the sample time, the charging capacitor 122 provides a signal on the input 130 of the comparator amplifier 128. When the signal on input 130 exceeds the magnitude of the reference signal on input 132, the comparator 128 produces an output of a positive voltage level. This output passes through the inverter 134 and interface 136 to the not reset input of the flip flop 138 producing a positive signal on the output of flip flop 138. The diode 140 and 142 and transistor 144 are connected in a NOR gate configuration. Therefore, during a good discharge with no arcing, the output of amplifier 128 holds, for the duration of the sample time from 104, the output of flip flop 138 high which also locks transistor 144 into conduction and does not allow the triggering of the monostable multivibrator 146.

If, however, during a good discharge an arcing condition exists, the noise signal will disappear. During the first sample time from the multivibrator 104, the capacitor 122 will not build up a charge; and the comparator 128 will not switch. Therefore, its output will remain at a less positive potential for the duration of the first sample time; and, the flip flop 138 will be susceptible to a clock pulse. The diodes 148, 150 and transistor 152 are also connected in a NOR gate configuration. Hence, during the second sample time from the multivibrator 106, the input through the diode 150 is at a lower potential level; therefore, the transistor 152 stops conducting. This results in the collector of transistor 152 going to a more positive potential which is connected to the clock input of flip flop 152 and in fact does clock said flip flop thus switching its output to a less positive potential. At the end of the second sample time, the input on diode 150 goes to a more positive potential which drives transistor 152 into conduction thus dropping the potential on its collector to a less positive value. At this time, both the anodes of diodes 140 and 142 are low and conduction through transistor 144 is terminated thus driving its collector to a more positive potential. This triggers the monostable multivibrator 146 which produces a pulse on the output of the noise detector 18 indicating the presence of an arcing condition.

In FIG. 6b, the output pulse from the noise detector 18 indicating the arcing condition is input to the cycle control 36 which initiates a correction cycle calculated to alleviate the arcing condition. It is readily apparent that the noise detector 18 detects a noise on a per discharge basis. However, the EDM process is one which is highly unpredictable. In many cases, an arcing condition may start; but due to the other dynamic conditions of the process, e.g. flow rate, dielectric strength, etc., the arcing condition may clear itself. In such a situation, it would be unnecessary and in fact, detrimental to the efficiency of the process to take immediate remedial action for alleviating the arcing condition. Therefore, in the preferred embodiment, applicant proposes a system having the ability to wait for several discharges in order to give the process an opportunity to clear itself. This is the function of the counter 154. There are many configurations of logic counters which are well-known to those who are skilled in the art of logic design. Applicant has arbitrarily chosen a configuration that has the ability to preset or load in to the counter a predetermined input. The input circuit 156 may be a set of switches, or it may be a wiring configuration which is permanently established. In this case, the counter 154 has been preset by the input circuit 156 through the gate 158 with a number representing the predetermined minimum number of arcing signals which must occur before corrective action is taken. Every time the counter receives an output from the noise detector 18, it counts down one increment. When it has detected the predetermined number of arcs, it passes through a zero state; and this transistion is detected by the zero detector 160.

The zero detector outputs a first command signal to generate several actions. First, it is fed back to the gate 155 which operates to inhibit the counting action of the counter 154. Second, it is output from the cycle control 36 and input to the ON time switch 46 and the OFF time switch 48 of the pulse energy control 28 (shown in FIG. 5). This immediately reduces the pulse energy of succeeding pulses and synchronizes the pulse occurences with the driving mechanism moving the tool. Third, the signal is used to preset the sign generator 162 to command the stepping motor drive circuits 44 to move the tool toward the workpiece. The sign generator 162 may be nothing more than a flip flop connected to toggle or switch its output for every clock pulse received. Fourth, the first command signal is gated with feed pulses in the gate 164. For purposes of this disclosure, the feed pulses are shown to originate from the servo feed pulse source 166. Typically, these pulses are available in the cycle control portion of the normal servomechanism circuits which are not shown in this disclosure. The output of the gate 164 is input to gate 168 whose output is connected to the stepping motor drive circuits 44. Hence, the first command signal is operative to move the tool toward the workpiece. The output of gate 164 is also connected to an up/down counter 169 which accumulates the pulses produced from the gate 164. When the tool 12 is in close proximity to the workpiece 14, the short circuit detector 24 of FIG. 6a will produce an output indicating a short circuit to the cycle control 36.

This signal is stored in the short circuit store 170 which produces a second command signal output. This output is operative to preset the counter 154 through the gate 158. This terminates the output from the zero detector 160 and hence, the first command signal. Second, the second command signal passes through the gate 172 and out of the cycle control 36 to the pulse termination switch 50 of the pulse energy control 28 thus terminating the output of machine pulses and the production of electrical discharges across the gap 16. Third, the second command signal is gated with feed pulses in gate 174 having an output connected to gate 168. Hence the feed pulses are supplied to the driving mechanism as earlier described. Fourth, the output of gate 174 is input to the periodic motion generator 38.

The generator 38 is operative to provide a cyclic motion of the tool 12 toward and away from the workpiece 14. The input circuit 176 defines or predetermines the magnitude of the tool stroke or motion. The input circuit 178 defines the number of cycles of said motion. With the magnitude of the motion preset in counter 180, the counter 180 counts down for every pulse delivered to the stepping motor drive circuits from the gate 174. When the predetermined magnitude of motion is executed, the counter 180 reaches its zero condition which is detected by the zero detector 182. The output of the zero detector 182 passes through the gate 184 to clock the sign generator 162 which is operative to reverse the direction of motion. Second, the zero detector output is input to counter 186 which is keeping track of the number of cycles. Third, the output is input to the gate 188 and permits the input circuit 176 to again load the counter 180. This, of course, then terminates the output of the zero detector 182. The feed pulses continue to be output from the gate 174 and the counter 180 again counts down. However, this time the tool is moving away from the workpiece. When the predetermined motion is executed again, the output of the zero detector 182 reverses the sign output of generator 162, clocks the counter 186, and loads the counter 180. This cycle is repeated a number of times defined by the number in the counter 186. When the counter 186 passes through its zero condition, the zero detector 190 produces a third command signal output.

First, the third command signal is gated to the sign generator 162 which produces a sign signal for moving the tool away from the workpiece. Second, the third command signal is used to preset the short circuit store 170 thus terminating the second command signal. Third the command signal passes through gate 172 to maintain the pulse termination switch thus holding off the production of discharges. Fourth, the third command signal is gated with feed pulses in gate 192 which as an output passing through the gate 168 and into the stepping motor drive circuits 44. Hence, the tool 12 is moved away from the workpiece 14 thus increasing the magnitude of the gap 16. Further, the output of gate 192 is connected to an input of the up/down counter 169. This counter input is operative to count the counter 169 down. When a counter passes through its zero condition, the zero detector 194 produces an output to the gate 196 of the motion generator 38. This signal is operative to preset or load the counter 186 thus terminating the output from the zero detector 190 and consequently the third command signal. At this time the tool is positioned relative to the workpiece to define the same gap magnitude as when the arcing condition was first detected. The pulse energy control is returned to its original inactive state and, therefore, the normal machining process is resumed.

While the invention has been illustrated in some detail according to the preferred embodiments shown in the accompanying drawings and while the preferred illustrated embodiments have been described in some detail, there is no intention to thus limit the invention to such detail. On the contrary, it is intended to cover all modifications, alterations and equivalents falling within the spirit and scope of the appended claims.

What is claimed is:

1. An EDM apparatus of the type comprised in part of a driving mechanism coupled between an electrically conductive tool and an electrically conductive workpiece for establishing a relative position therebetween defining a machining gap of a predetermined magnitude, said gap having electrical discharges passed thereacross, wherein the improvement comprises:
   a. means connected across the machining gap for detecting the presence of a noise signal during the discharges; and
   b. means connected between the detecting means and the driving mechanism for successively decreasing and increasing the magnitude of the machining gap a predetermined number of times in response to the absence of the noise signal.

2. The apparatus of claim 1 wherein the means for successively increasing and decreasing further comprises:
   a. means connected to the tool and workpiece for detecting a short circuit in the machining gap; and
   b. means having inputs connected to the noise detector and the short circuit detector and having an output connected to the driving mechanism for generating output command signals including,
      1. a first output signal for commanding the driving mechanism to decrease the magnitude of the machining gap
      2. a second output signal for commanding the driving mechanism to alternately decrease and increase the magnitude of the machining gap a predetermined number of times, and
      3. a third output signal for commanding the driving mechanism to restore the magnitude of the machining gap to its predetermined magnitude.

3. An EDM apparatus of the type comprised in part of a driving mechanism coupled between an electrically conductive tool and an electrically conductive workpiece for establishing therebetween a machining gap of a predetermined magnitude and a power supply connected to said tool and workpiece for generating electrical discharges across the machining gap, wherein the improvement comprises:
   a. means connected to the tool and workpiece for detecting the absence of a noise signal in the machining gap during a discharge;
   b. means connected to the tool and workpiece for detecting the presence of a short circuit in the machining gap during a discharge;
   c. means having inputs connected to the detecting means and an output connected to the driving mechanism for generating a plurality of command signals, said command signals including,
      1. a first signal in response to the detection of an absence of the noise signal for commanding the driving mechanism to decrease the magnitude of the machining gap,
      2. a second signal in response to the detection of a short circuit for commanding the driving mechanism to successively decrease and increase the magnitude of the machine gap a predetermined number of times, and
      3. a third signal for commanding the driving mechanism to restore the predetermined magnitude of the machining gap; and
   d. means having an input connected to the generating means and an output connected to the power supply for modifying the generation of electrical discharges in response to the second and third signals.

4. The apparatus of claim 3 wherein the modifying means comprises means for terminating the generation of electrical discharges for the duration of the second and third signals.

5. An EDM apparatus of the type comprised in part of a driving mechanism coupled between an electrically conductive tool and an electrically conductive workpiece for establishing a machining gap of a predetermined magnitude and a power supply connected to said tool and workpiece for producing electrical discharges of a predetermined energy level across the machining gap, wherein the improvement comprises:
   a. a noise detector connected to the tool and workpiece for producing a first output signal upon detecting an absence of a noise signal;
   b. a short circuit detector connected to the tool and workpiece for producing a second output signal upon detecting a short circuit between the tool and workpiece;
   c. command generator having inputs connected to the noise detector and the short circuit detector and generating a plurality of output command signals for commanding the driving mechanism, said command signals including,
      1. a first command signal in response to the first output signal for decreasing the magnitude of the machining gap,
      2. a second command signal in response to the second output signal for alternately decreasing and increasing the magnitude of the machining gap for a predetermined period of time, and 3. a third command signal for restoring the predetermined magnitude of the machining gap; and d. a pulse energy control connected between the command generator and the power supply for reducing the energy of the electrical discharges in response to the first command signal and terminating the production of electrical discharges in response to the second and third command signals.

6. The apparatus of claim 5 wherein the command generator comprises:
   a. means for initiating the first command signal in response to the absence of the noise signal;
   b. means for initiating the second command signal and terminating the first command signal in response to the detection of a short circuit;
   c. means for measuring the magnitude of a decrease in the machining gap during the first command signal;
   d. a periodic motion generator operative in response to the second command signal for commanding the tool to periodically move toward and away from the workpiece a predetermined number of cycles, and including,
      1. means for predetermining the magnitude of said periodic motion,
      2. means for predetermining the number of cycles, and
      3. means for initiating the third command signal and terminating the second command signal in response to the predetermined number of cycles of periodic motion; and
   e. means responsive to the measuring means for terminating the third command signal in response to the restoration of the predetermined magnitude of the machining gap.

7. An EDM process for removing metal having the steps of applying a voltage signal to a machining gap for initiating a spark discharge thereacross, melting a volume of metal and terminating the spark discharge after a predetermined period of time, wherein the improved process comprises the steps of:
   a. detecting the absence of a noise signal in the voltage signal during a discharge; and
   b. moving the tool toward and away from the workpiece a predetermined number of times in response to detecting the absence of the noise signal for disturbing the surface characteristics of the tool and workpiece.

8. An EDM process for removing metal having the steps of applying a voltage signal to a machining gap of a predetermined magnitude for initiating a spark discharge thereacross, melting a volume of metal and terminating the spark discharge after a predetermined period of time commensurate with a predetermined energy level, wherein the improved process comprises the steps of:
   a. detecting the absence of a noise signal in the voltage signal during a discharge;
   b. moving the tool toward the workpiece in response to detecting the absence of the noise signal until detecting a short circuit;
   c. terminating the spark discharges across the machining gap in response to detecting the short circuit;
   d. moving the tool toward and away from the workpiece a predetermined number of times after terminating the spark discharges; and
   e. moving the tool away from the workpiece to restore the predetermined machining gap magnitude 9. An EDM process for removing metal having the steps of applying a voltage signal to a machining gap of a predetermined magnitude for initiating a spark discharge thereacross, melting a volume of metal and terminating the spark discharge after a predetermined period of time commensurate with a predetermined energy level, wherein the improved process comprises the steps of:
   a. detecting the absence of a noise signal in the voltage signal during a discharge;
   b. reducing the energy level of the spark discharge in response to detecting the absence of the noise signal;
   c. moving the tool toward the workpiece in response to reducing the energy level of the spark discharges until a short circuit is detected;
   d. reducing the energy level of the spark discharges to a zero value in response to detecting the short circuit;
   e. moving the tool toward and away from the workpiece a predetermined number of times in response to the zero energy level of the spark discharges;
   f. moving the tool away from the workpiece to restore the predetermined gap magnitude; and
   g. restoring the initiation of spark discharges across the gap in response to the restoration of the predetermined gap magnitude.

* * * * *